United States Patent
Park (10) Patent No.: US 10,021,199 B2
(45) Date of Patent: Jul. 10, 2018

(54) APPARATUS AND METHOD FOR PROVIDING STREAMING MUSIC SERVICE

(75) Inventor: Sun-Eung Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 750 days.

(21) Appl. No.: 13/481,519

(22) Filed: May 25, 2012

(65) Prior Publication Data

US 2012/0303711 A1 Nov. 29, 2012

(30) Foreign Application Priority Data

May 27, 2011 (KR) .................. 10-2011-0050637

(51) Int. Cl.
| | |
|---|---|
| *G06F 13/00* | (2006.01) |
| *H04L 29/08* | (2006.01) |
| *G06Q 10/10* | (2012.01) |
| *G06F 17/30* | (2006.01) |
| *H04L 29/06* | (2006.01) |

(52) U.S. Cl.
CPC ........ *H04L 67/22* (2013.01); *G06F 17/30873* (2013.01); *G06Q 10/10* (2013.01); *H04L 65/4092* (2013.01); *H04L 65/602* (2013.01); *H04L 65/80* (2013.01)

(58) Field of Classification Search
CPC ........ G06Q 50/01; G06Q 10/10; H04L 12/58; H04L 12/588; H04L 51/32; H04L 51/00; H04L 67/22; H04L 65/4092; H04L 65/602; H04L 65/80; G06F 17/30873
USPC .................. 709/204–206, 231, 217–219; 715/751–759
See application file for complete search history.

(56) References Cited

U.S. PATENT DOCUMENTS

| | | | |
|---|---|---|---|
| 8,051,145 B2* | 11/2011 | Wu et al. ....................... | 709/219 |
| 2008/0243996 A1* | 10/2008 | Wu et al. ....................... | 709/203 |
| 2009/0249222 A1* | 10/2009 | Schmidt et al. .............. | 715/751 |
| 2010/0205276 A1* | 8/2010 | Quintarelli .................... | 709/217 |
| 2010/0235529 A1 | 9/2010 | Watanabe | |

FOREIGN PATENT DOCUMENTS

KR 10-2010-0043931 A 4/2010

OTHER PUBLICATIONS

Korean Intellectual Patent Office, "Notice of Preliminary Rejection," Application No. 10-2011-0050637, Dec. 23, 2016, publisher KIPO, Daejeon, Republic of Korea.
Dong-Kyun Lee, et al., "Structure and Implentation of Social Information Sharing System using Social Content Channel," vol. 10, No. 8, 2010.

(Continued)

*Primary Examiner* — Kenneth R Coulter (57) ABSTRACT

An apparatus and a method for sharing contents provided based on a social network between members of the social network. A content providing method includes, when a first terminal in a social network requests to use content, transmitting the corresponding content to the first terminal. The method also includes transmitting content use information associated with the first terminal to at least one adjacent terminal in the social network, via the social network. The method further includes, when a second terminal of the at least one adjacent terminal requests to use the same content as the first terminal, transmitting the same content to the second terminal.

20 Claims, 8 Drawing Sheets

(56) References Cited

OTHER PUBLICATIONS

Communication from a foreign patent office in a counterpart foreign application, "Notice of Final Rejection," Korean Application No. 10-2011-0050637, Jun. 27, 2017, 7 pages.
Communication from a foreign patent office in a counterpart foreign application, "Notice of Final Rejection," Korean Application No. 10-2011-0050637, Jul. 31, 2017, 6 pages.
Notice of Preliminary Rejection regarding Korean Patent Application No. 10-2017-0110371, dated Nov. 1, 2017, 11 pages.

* cited by examiner

APPARATUS AND METHOD FOR PROVIDING STREAMING MUSIC SERVICE

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on May 27, 2011, and assigned Serial No. 10-2011-0050637, the entire disclosure of which is hereby incorporated by reference.

TECHNICAL FIELD OF THE INVENTION

The present disclosure relates generally to an apparatus and a method for providing a streaming music service. More particularly, the present disclosure relates to an apparatus and a method for sharing contents provided based on a social network between members of the social network.

BACKGROUND OF THE INVENTION

A music service based on a social network does not merely provide the music but supports various services such as making, friends or sharing music between users. For example, the music service based on the social network displays music recently played by a member of the social network, or a favorite music list of the member. The music service based on the social network may display music currently being played by the member.

The music service based on the social network provides a function which displays the music genre and the favorite music played by the member of the social network. That is, the music service based on the social network merely provides log information of the members, rather than providing the music content played to the member of the social network.

Accordingly, what is needed is a method for sharing the contents of the members of the social network in the music service based on the social network.

SUMMARY OF THE INVENTION

To address the above-discussed deficiencies of the prior art, it is a primary aspect of the present disclosure to provide an apparatus and a method for sharing contents provided based on a social network between members of the social network.

Another aspect of the present disclosure is to provide an apparatus and a method for sharing multimedia contents provided based on a social network between members of the social network.

Yet another aspect of the present disclosure is to provide an apparatus and a method for sharing music contents provided through a music service based on a social network between members of the social network.

Still another aspect of the present disclosure is to provide an apparatus and a method for sharing music contents provided to a particular user through a music service based on a social network between members of the social network.

A further aspect of the present disclosure is to provide an apparatus and a method for transmitting music content information provided to a particular user through a music service based on a social network, to members of the social network.

According to one aspect of the present disclosure, a method for providing contents includes when a first terminal in a social network requests to use content, transmitting the corresponding content to the first terminal. The method also includes transmitting content use information associated with the first terminal to at least one adjacent terminal in the social network, via the social network. The method further includes when a second terminal of the at least one adjacent terminal requests to use the same content as the first terminal, transmitting the same content to the second terminal.

According to another aspect of the present disclosure, an apparatus for providing contents in a social network service server includes a storage configured to store at least one content and information associated with a social network member. The apparatus also includes a transmission module configured to, when a first terminal in a social network requests to use a content, transmit the corresponding content to the first terminal, and when a second terminal in the social network requests to use the same content as the first terminal, transmit the same content to the second terminal.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for sharing contents provided based on a social network, between members of the social network.

Hereinafter, "content" is used as the term for embracing the service provided based on the social network, and may include music, movie, video, e-book, and game.

It is assumed that music contents are shared through the social network. Furthermore, when content such as movie, video, e-book, and game is used, the members of the social network can share the corresponding content in the same manner.

A term "terminal" embraces devices used by a user to access the social network, and may include a mobile communication terminal, a Personal Data Assistant (PDA), a portable computer, a personal computer, a smart phone, a tablet PC, and so on.

Figure 1:
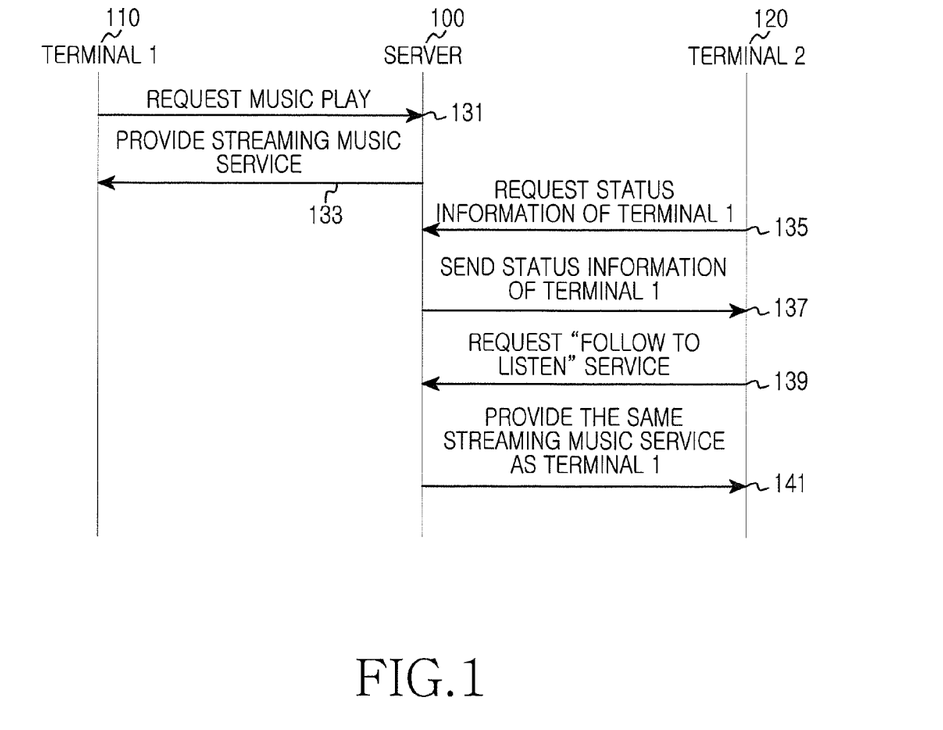
FIG. 1 illustrates a method for sharing a music content provided through a music service based on a social network according to an embodiment of the present disclosure.

FIG. 1 illustrates a method for sharing a music content provided through a music service based on a social network according to an embodiment of the present disclosure.

The social network includes a first terminal 110 and a second terminal 120 as shown in FIG. 1.

When a user of the first terminal 110 wants to listen to music, the first terminal 110 requests the music to a server 100 in step 131. Herein, the server 100 provides a social network server function for the information exchange of users, and a streaming music service.

The server 100 streams the music content requested by the first terminal 110 to the first terminal 110 in step 133. The first terminal 110 plays the music content streamed from the server 100.

When the second terminal 120 requests status information of the first terminal 110 while the server 100 streams the music content to the first terminal 110 in step 135, the server 100 transmits the status information of the first terminal 110 to the second terminal 120 in step 137. For example, the server 100 transmits information of the music content streamed to the first terminal 110, to the second terminal 120.

When a user of the second terminal 120 requests a "follow to listen" service to listen to the music together with the user of the first terminal 110, the second terminal 120 requests the "follow to listen" service to the server 100 in step 139.

According to the request of the second terminal 120, the server 100 streams the same music content as the music content streamed to the first terminal 110, to the second terminal 120 in step 141. For example, the server 100 streams the same music content as the music content streamed to the first terminal 110, to the second terminal 120 separately from the first terminal 110. In so doing, the second terminal 120 can play the music content from the beginning. In another example, the server 100 streams the same music content to the first terminal 110 and the second terminal 120 at the same time. In this situation, the second terminal 120 can play the music synchronized with the music played to the first terminal 110. Hence, the second terminal 120 may play the music content in the middle according to the music play time of the first terminal 110.

Figure 2:
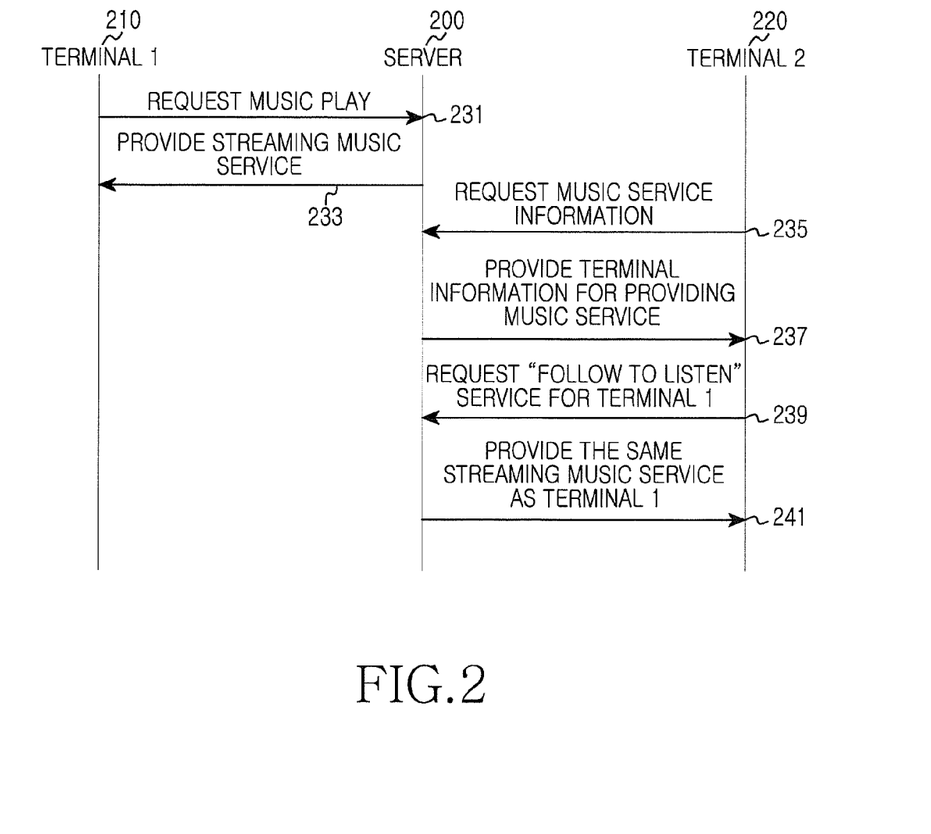
FIG. 2 illustrates a method for sharing the music content provided through the music service based on the social network according to another embodiment of the present disclosure.

FIG. 2 illustrates a method for sharing the music content provided through the music service based on the social network according to another embodiment of the present disclosure.

The social network includes a first terminal 210 and a second terminal 220 as shown in FIG. 2.

When a user of the first terminal 210 wants to listen to music, the first terminal 210 requests the music to a server 200 in step 231. Herein, the server 200 provides the social network server function for the information exchange of users, and the streaming music service.

The server 200 streams the music content requested by the first terminal 210 to the first terminal 210 in step 233. The first terminal 210 plays the music content streamed from the server 200.

When the second terminal 220 requests music service information while the server 200 streams the music content to the first terminal 210 in step 235, the server 200 transmits a terminal list of the music service currently provided, to the second terminal 220 according to the request of the second terminal 220 in step 237.

When a user of the second terminal 220 selects the first terminal 210 in the terminal list received from the server 200, the second terminal 220 requests a "follow to listen" service of the first terminal 210 to the server 200 in step 239.

According to the request of the second terminal 220, the server 200 streams the same music content as the music content streamed to the first terminal 210, to the second terminal 220 in step 241. For example, the server 200 streams the same music content as the music content streamed to the first terminal 210, to the second terminal 220 separately from the first terminal 210. In so doing, the second terminal 220 can play the music content from the beginning. In another example, the server 200 streams the same music content to the first terminal 210 and the second terminal 220 at the same time. In this situation, the second terminal 220 can play the music synchronized with the music played to the first terminal 210. Hence, the second terminal 220 may play the music content in the middle according to the music play time of the first terminal 210.

Figure 3:
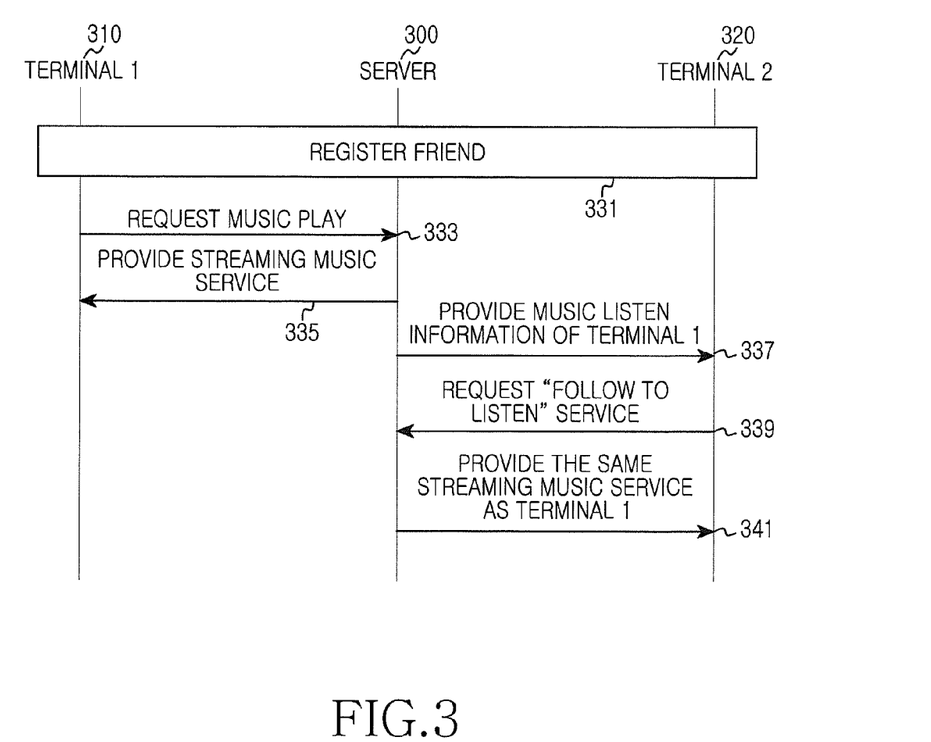
FIG. 3 illustrates a method for sharing the music content provided through the music service based on the social network according to yet another embodiment of the present disclosure.

FIG. 3 illustrates a method for sharing the music content provided through the music service based on the social network according to yet another embodiment of the present disclosure.

In the social network of FIG. 3, a second terminal 320 registers a first terminal 310 as a friend in step 331. Herein, the friend indicates the terminal registered by the second terminal 320 to share the music content.

When a user of the first terminal 310 wants to listen to music, the first terminal 310 requests the music to the server 300 in step 333. Herein, the server 300 provides the social network server function for the information exchange of users, and the streaming music service.

The server 300 streams the music content requested by the first terminal 310 to the first terminal 310 in step 335. The first terminal 310 plays the music content streamed from the server 300.

While streaming the music content to the first terminal 310, the server 300 determines whether there is a terminal that registers the first terminal 310 as a friend in the friend registration information. When the second terminal 320 registers the first terminal 310 as a friend, the server 300 transmits music listen information associated with the first terminal 310 to the second terminal 320 in step 337. Using at least one of a popup window, a sound, and a vibration, the second terminal 320 notifies the music listen information associated with the first terminal 310 to the user. Herein, the friend registration information indicates a list of terminals registered by the second terminal 320 to share the music content.

When a user of the second terminal 320 requests a "follow to listen" service to listen to the music together with the user of the first terminal 310, the second terminal 320 requests the "follow to listen" service of the first terminal 310 to the server 300 in step 339.

According to the request of the second terminal 320, the server 300 streams the same music content as the music content streamed to the first terminal 310, to the second terminal 320 in step 341. For example, the server 300 streams the same music content as the music content streamed to the first terminal 310, to the second terminal 320 separately from the first terminal 310. In so doing, the second terminal 320 can play the music content from the beginning. As another example, the server 300 streams the same music content to the first terminal 310 and the second terminal 320 at the same time. In this situation, the second terminal 320 can play the music synchronized with the music played to the first terminal 310. Hence, the second terminal 320 may play the music content in the middle according to the music play time of the first terminal 310.

Now, a method of the server for streaming the same music content to the second terminal as the music content streamed to the first terminal is explained.

Figure 4:
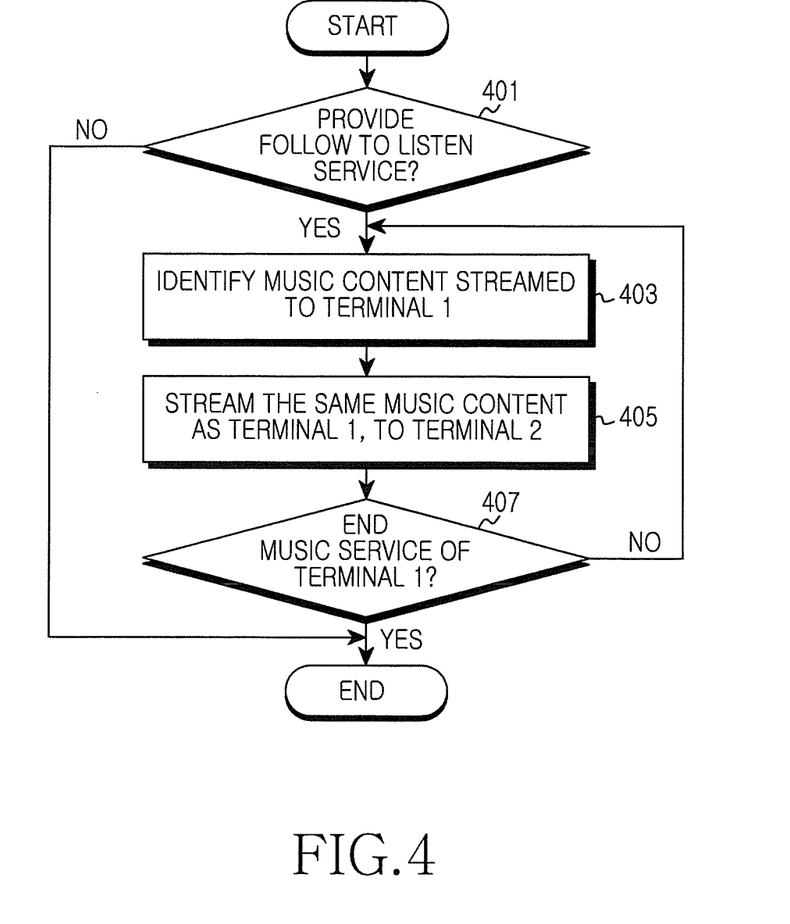
FIG. 4 illustrates a method of a server for transmitting the music content to social network members according to an embodiment of the present disclosure.

FIG. 4 illustrates a method of the server for transmitting the music content to social network members according to an embodiment of the present disclosure.

Referring to FIG. 4, the server determines whether to provide the "follow to listen" service for the music content streamed to the first terminal in step 401. For example, when the second terminal 120 requests the "follow to listen" service as shown in FIG. 1, the server 100 determines to provide the "follow to listen" service.

When the second terminal does not request the "follow to listen" service for the music content streamed to the first terminal, the server recognizes that the "follow to listen" service is not provided. Hence, the server finishes this process. Herein, the second terminal indicates the member of the social network including the first terminal.

When the second terminal requests the "follow to listen" service for the music content streamed to the first terminal, the server recognizes that the "follow to listen" service is provided. The server identifies the music content streamed to the first terminal in step 403.

Figure 8A:
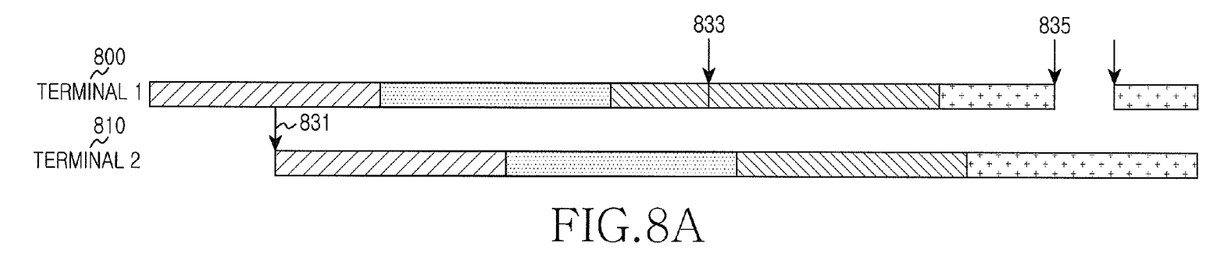
FIG. 8 illustrates synchronization of the music content shared by the social network members according to an embodiment of the present disclosure.

In step 405, the server streams the same music content to the second terminal as the music content streamed to the first terminal. In so doing, the server streams the music content to the second terminal separately from the first terminal. For example, the server streams the music content to a first terminal 800 as shown in FIG. 8A. When a second terminal 810 requests the "follow to listen" service with respect to the first terminal 800, the server streams the same music content as the music content streamed to the first terminal 800, to the second terminal 810 separately from the first terminal 800 in step 831. Accordingly, the second terminal 810 can play the music content without being affected by the music content control (e.g., pause or skip) 833 of the first terminal 800. Also, the second terminal 810 may play the music content without being affected by an interrupted streaming 835 resulting from a network disconnection of the first terminal 800.

In step 407, the server determines whether the music service provided to the first terminal ends.

When the music service provided to the first terminal does not end, the server identifies the music content streamed to the first terminal back in step 403.

By contrast, when the music service provided to the first terminal ends, the server finishes this process. That is, when the music service to the first terminal ends, the server terminates the "follow to listen" service to the second terminal.

In this embodiment, the server streams the music content to the second terminal separately from the first terminal.

Figure 5:
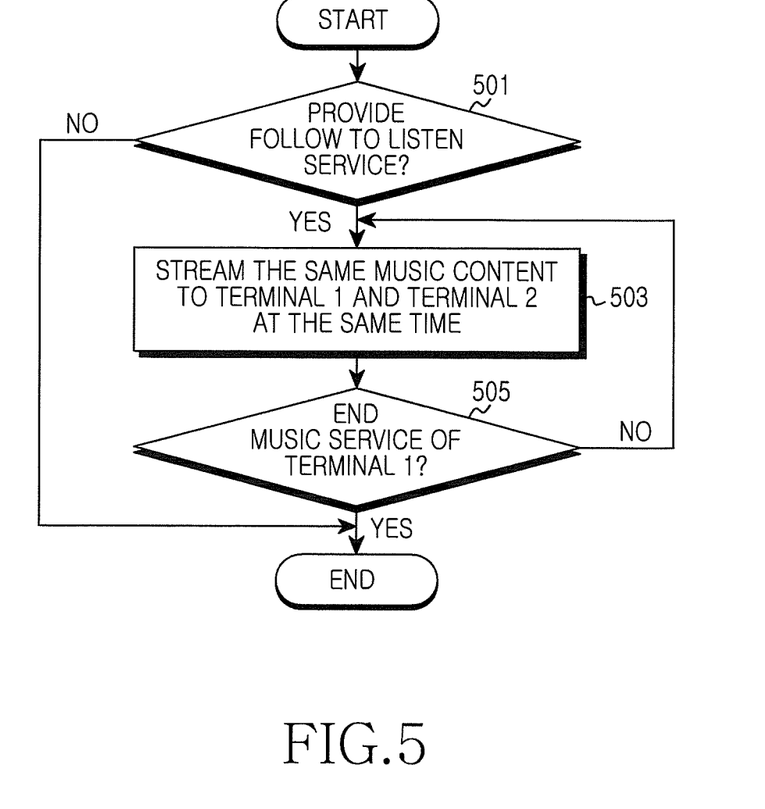
FIG. 5 illustrates a method of the server for transmitting the music content to the social network members according to another embodiment of the present disclosure.
Figure 6:
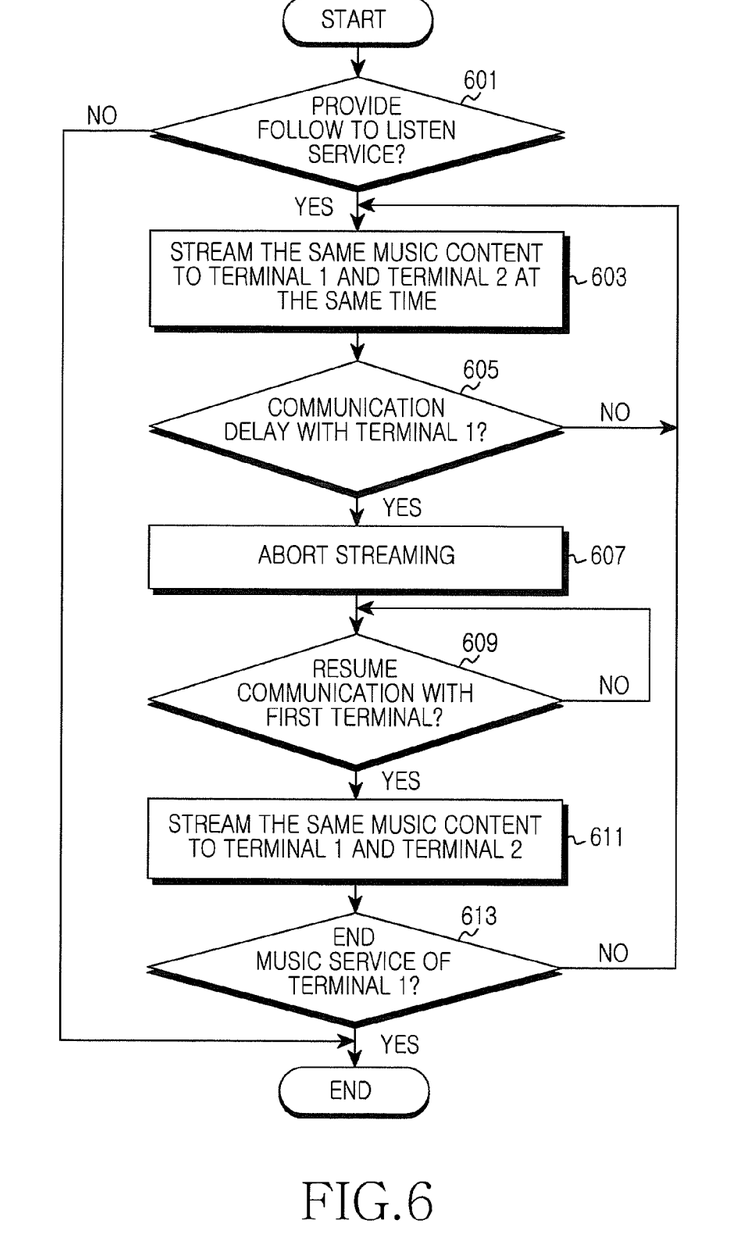
FIG. 6 illustrates a method of the server for transmitting the music content to the social network members according to yet another embodiment of the present disclosure.

Alternatively, the server may stream the same music content to the first terminal and the second terminal at the same time as shown in FIGS. 5 and 6.

FIG. 5 illustrates a method of the server for transmitting the music content to the social network members according to another embodiment of the present disclosure.

In step 501, the server determines whether to provide the "follow to listen" service for the music content streamed to the first terminal. For example, when the second terminal 120 requests the "follow to listen" service as shown in FIG. 1, the server 100 determines to provide the "follow to listen" service.

When the second terminal does not request the "follow to listen" service for the music content streamed to the first terminal, the server recognizes that the "follow to listen" service is not provided. Hence, the server finishes this process.

Figure 8B:
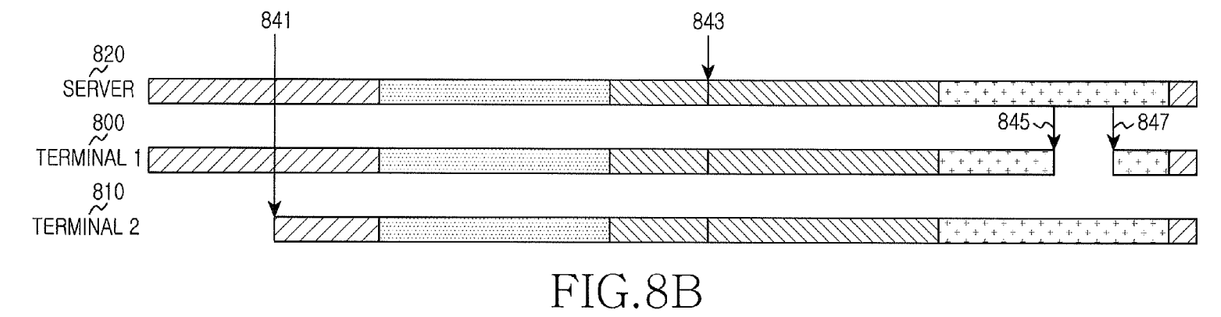

When the second terminal requests the "follow to listen" service for the music content streamed to the first terminal, the server recognizes that the "follow to listen" service is provided. Hence, the server streams the music content originally streamed only to the first terminal, to the first terminal and the second terminal at the same time in step 503. For example, the server 820 streams the music content to the first terminal 800 as shown in FIG. 8B. When the second terminal 810 requests the "follow to listen" service for the first terminal 800, the server concurrently streams the music content originally streamed only to the first terminal 800, to the first terminal 800 and the second terminal 810 in step 841. In so doing, the second terminal 810 can play the same music at the same point as the first terminal 800. Thus, the second terminal 810 may play the music content in the middle according to the music play time of the first terminal 800. Since the same music content as the first terminal 800 is streamed to the second terminal 810 at the same time, the playback of the music content can change according to the music content control (e.g., pause or skip) 843 of the first terminal 800. In one embodiment, the server streams the music content such as through a broadcasting service. Accordingly, the second terminal 810 may play the music content without being affected by an interruption of streaming 845 by a network disconnection of the first terminal 800.

In step 505, the server determines whether the music service provided to the first terminal ends.

When the music service provided to the first terminal does not end, the server streams the same music content to the first terminal and the second terminal at the same time in step 503.

By contrast, when the music service provided to the first terminal ends, the server finishes this process. That is, when the music service to the first terminal ends, the server terminates the "follow to listen" service to the second terminal.

FIG. 6 illustrates a method of the server for transmitting the music content to the social network members according to yet another embodiment of the present disclosure.

In step 601, the server determines whether to provide the "follow to listen" service for the music content streamed to the first terminal. For example, when the second terminal 120 requests the "follow to listen" service as shown in FIG. 1, the server 100 determines to provide the "follow to listen" service.

When the second terminal does not request the "follow to listen" service for the music content streamed to the first terminal, the server recognizes that the "follow to listen" service is not provided. Hence, the server finishes this process.

Figure 8C:
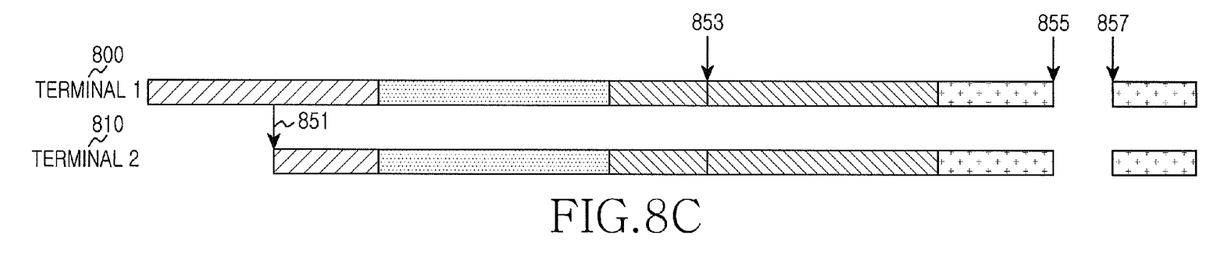

By contrast, when the second terminal requests the "follow to listen" service for the music content streamed to the first terminal, the server recognizes that the "follow to listen" service is provided. Hence, the server streams the music content originally streamed only to the first terminal, to the first terminal and the second terminal at the same time in step 603. For example, the server 820 streams the music content to the first terminal 800 as shown in FIG. 8C. When the second terminal 810 requests the "follow to listen" service for the first terminal 800, the server concurrently streams the music content originally streamed only to the first terminal 800, to the first terminal 800 and the second terminal 810 in step 851. In so doing, the second terminal 810 can play the same music at the same point as the first terminal 800. Thus, the second terminal 810 may play the music content in the middle according to the music play time of the first terminal 800. Since the same music content as the first terminal 800 is streamed to the second terminal 810 at the same time, the playback of the music content can change according to the music content control (e.g., pause or skip) 853 of the first terminal 800.

In step 605, the server determines whether the communication with the first terminal is delayed.

When there is no communication delay with the first terminal, the server streams the same music content to the first terminal and the second terminal at the same time in step 603.

By contrast, when the communication with the first terminal is delayed, the server stops the streaming to the first terminal and the second terminal in step 607. For example, when the streaming is aborted by a network disconnection of the first terminal 800 as shown in FIG. 8C, the server also aborts the streaming to the second terminal.

In step 609, the server determines whether the communication with the first terminal is resumed.

When the communication with the first terminal is resumed, the server resumes the streaming aborted in step 607, in step 611. That is, the server streams the same music content to the first terminal and the second terminal at the same time.

In step 613, the server determines whether the music service provided to the first terminal ends.

When the music service provided to the first terminal does not end, the server streams the same music content to the first terminal and the second terminal at the same time in step 603.

By contrast, when the music service provided to the first terminal ends, the server finishes this process. That is, when the music service to the first terminal ends, the server terminates the "follow to listen" service to the second terminal.

In the following, a structure of the server for providing the social network server function and the streaming music service is explained.

Figure 7:
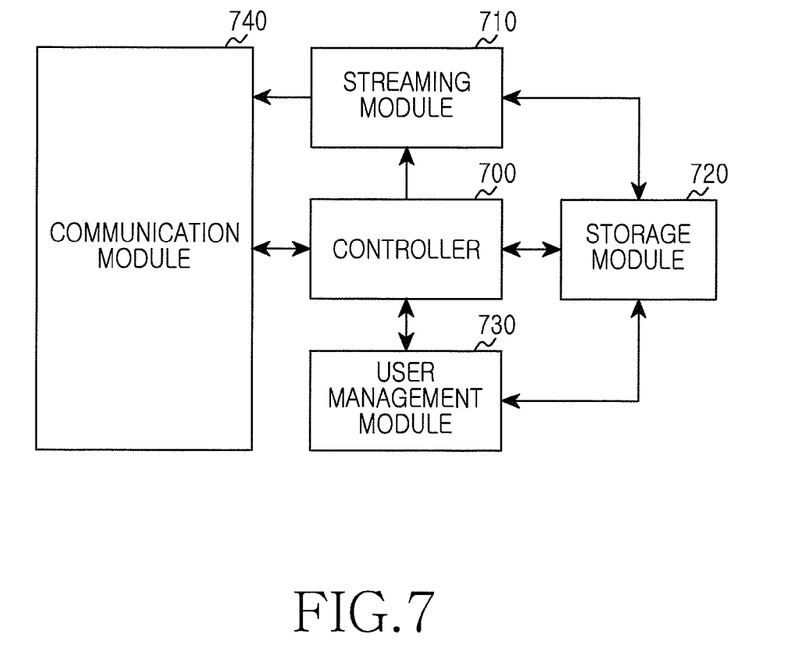
FIG. 7 illustrates the server according to an embodiment of the present disclosure.

FIG. 7 is a block diagram of the server according to an embodiment of the present disclosure.

As shown in FIG. 7, the server includes a controller 700, a streaming module 710, a storage module 720, a user management module 730, and a communication module 740.

The controller 700 controls the operations of the server. For example, the controller 700 controls to share and exchange the information between the users over the social network. The controller 700 controls the streaming module 710 to provide the music service to the user who requests the music through the communication module 740. When the second terminal requests the "follow to listen" service for the first terminal, the controller 700 controls the streaming module 710 to stream the same content to the first terminal and the second terminal. In so doing, the controller 700 controls the streaming module 710 to stream the same content to the first terminal and the second terminal in a manner as shown in FIG. 4, 5, or 6.

Under the control of the controller 700, the streaming module 710 streams the music content to the corresponding terminal. For example, when the second terminal requests the "follow to listen" service for the first terminal, the streaming module 710 streams the same music content as the music content streamed to the first terminal, to the second terminal. In so doing, the streaming module 710 streams the music content to the second terminal separately from the first terminal. For example, when the second terminal requests the "follow to listen" service for the first terminal, the streaming module 710 streams the same music content to the first terminal and the second terminal at the same time.

The storage module 720 can include a program storage for storing a program to control the operations of the server, and a data storage for storing data generating in the program execution. For example, the storage module 720 stores the music content for the streaming, and member information of the social network.

The user management module 730 determines whether there is another terminal that registers the terminal requesting the music play to the controller 700 as a friend by considering friend registration information stored to the storage module 720. When detecting the other terminal which registers the terminal requesting the music play as a friend, the user management module 730 provides the other terminal information to the controller 700. The controller 700 transmits the music play information of the terminal registered as the friend to the other terminal.

The communication module 740 sends and receives signals to and from user terminals by cable or by radio.

In this embodiment, the server includes the streaming module 710 for streaming the music content. Although it is not depicted here, the streaming module 710 may be included in a transmission module for transmitting the content.

As set forth above, as members of a social network share contents provided based on the social network, a bond can be formed between the social network members by sharing the contents of each member. Furthermore, music content consumption can be increased by sharing the music with multiple members.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing content by a server, the method comprising:
    when a first terminal in a social network requests to use the content, streaming, by the server, the content to the first terminal;
    transmitting, by the server, content use information associated with the first terminal to at least one adjacent terminal in the social network, via the social network;
    when a second terminal in the social network requests to use a same content as the first terminal, streaming, by the server, the same content to the second terminal; and
    in response to detecting a communication delay for the first terminal, stopping, by the server, the streaming to the first terminal and the second terminal while the communication delay for the first terminal is detected,
    wherein the second terminal comprises at least one adjacent terminal that requests to use the same content as the first terminal, among the at least one adjacent terminal in the social network.

2. The method of claim 1, wherein the content comprises at least one of a music, a movie, a video, an e-book, and a game.

3. The method of claim 1, wherein the streaming of corresponding content to the first terminal comprises:
    when the first terminal requests to play a music content, streaming corresponding music content to the first terminal.

4. The method of claim 1, wherein the transmitting to the at least one adjacent terminal via the social network comprises:
    when providing the content to the first terminal, determining whether a content sharing terminal list comprises a terminal which registers the content sharing with the first terminal; and
    when at least one adjacent terminal in the social network registers the content sharing with the first terminal, transmitting the content use information of the first terminal to the at least one adjacent terminal.

5. The method of claim 1, wherein the streaming to the at least one adjacent terminal via the social network comprises:
    streaming a list of at least one terminal that provides the content, via the social network.

6. The method of claim 1, wherein the streaming of the content to the second terminal comprises:
    identifying the content provided to the first terminal; and
    streaming the identified content to the second terminal separately from the first terminal.

7. The method of claim 1, wherein the streaming of the content to the second terminal comprises:
    streaming the same content to the first terminal and the second terminal at a same time.

8. The method of claim 1, wherein the streaming of the content to the second terminal comprises:
    streaming a music content streamed to the first terminal, to the second terminal at a same time.

9. The method of claim 1, further comprising:
    when the content transmission to the first terminal is interrupted, continuing to stream the content to the second terminal.

10. The method of claim 1, further comprising:
    in response to resuming communications with the first terminal, resuming the streaming to the first terminal and the second terminal.

11. An apparatus for providing content in a social network service server, the apparatus comprising:
    a storage configured to store the content and information associated with a social network member;
    a transmission module; and
    a processor configured to, when a first terminal in a social network requests to use the content, stream corresponding content to the first terminal through the transmission module; when a second terminal in the social network requests to use a same content as the first terminal, stream the same content to the second terminal through the transmission module; and in response to detecting a communication delay for the first terminal by a network disconnection, stop the streaming to the first terminal and the second terminal while the communication delay for the first terminal is detected; and
    wherein the second terminal comprises at least one adjacent terminal that requests to use the same content as the first terminal, among at least one adjacent terminal in the social network.

12. The apparatus of claim 11, wherein the content comprises at least one of a music, a movie, a video, an e-book, and a game.

13. The apparatus of claim 11, wherein the transmission module comprises:

a streaming module configured to, when the first terminal requests to play a music content, stream corresponding music content to the first terminal.

14. The apparatus of claim 13, wherein, when the second terminal requests to use the same music content as the first terminal, the streaming module streams the music content streamed to the first terminal, to the second terminal at a same time.

15. The apparatus of claim 11, wherein the processor is further configured to:
   when streaming the content to the first terminal, determine whether a content sharing terminal list comprises a terminal that registers the content sharing with the first terminal, and
   when at least one adjacent terminal in the social network registers the content sharing with the first terminal, control the transmission module to transmit, via the transmission module, content use information of the first terminal to the at least one adjacent terminal.

16. The apparatus of claim 11, wherein the processor is further configured to control the transmission module to transmit a list of at least one terminal that uses the content, via the social network.

17. The apparatus of claim 11, wherein the transmission module is configured to stream the content streamed to the first terminal, to the second terminal separately from the first terminal.

18. The apparatus of claim 11, wherein the transmission module is configured to stream the same content to the first terminal and the second terminal at a same time.

19. The apparatus of claim 11, wherein, when the content transmission to the first terminal is interrupted, the transmission module continues to stream the content to the second terminal.

20. The apparatus of claim 11, wherein the processor is further configured to:
   in response to resuming communications with the first terminal, resume the streaming to the first terminal and the second terminal.

* * * * *